US012429905B2

United States Patent
Bailey et al.

(10) Patent No.: US 12,429,905 B2
(45) Date of Patent: Sep. 30, 2025

(54) CHARTING CABINET

(71) Applicant: Bailey Hill, LLC, Longview, TX (US)

(72) Inventors: John Taylor Bailey, Longview, TX (US); Michael Shane Whitehurst, Longview, TX (US)

(73) Assignee: Bailey Hill, LLC, Longview, TX (US)

( * ) Notice: Subject to any disclaimer, the term of this patent is extended or adjusted under 35 U.S.C. 154(b) by 378 days.

(21) Appl. No.: 17/489,366

(22) Filed: Sep. 29, 2021

(65) Prior Publication Data

US 2022/0095791 A1 Mar. 31, 2022

Related U.S. Application Data

(60) Provisional application No. 63/085,060, filed on Sep. 29, 2020.

(51) Int. Cl.
*G06F 1/16* (2006.01)

(52) U.S. Cl.
CPC .......... *G06F 1/1607* (2013.01); *G06F 1/1601* (2013.01)

(58) Field of Classification Search
CPC ...... H05K 5/0021; H05K 5/00; G06F 1/1607; G06F 1/1601; G06F 1/166; A47B 67/02; A47B 2067/025
See application file for complete search history.

(56) References Cited

U.S. PATENT DOCUMENTS

| | | | | |
|---|---|---|---|---|
| 6,246,573 B1* | 6/2001 | Khan | ........................ | G06F 1/16 361/679.55 |
| 7,154,397 B2* | 12/2006 | Zerhusen | ............. | A61G 7/0507 340/286.07 |
| 7,178,469 B2* | 2/2007 | Goza | ................... | A47B 21/0314 108/50.01 |
| 7,527,155 B2* | 5/2009 | McClain | ................ | G06F 1/181 211/126.2 |
| 7,997,211 B2* | 8/2011 | Peterson | ............ | F16M 11/2014 108/50.01 |
| 8,210,548 B1* | 7/2012 | Agyemang | ............ | A61B 50/13 280/47.35 |
| 8,446,723 B2* | 5/2013 | Goza | .................... | H05K 5/0021 361/747 |
| 10,349,564 B2* | 7/2019 | Murphy | ............... | H05K 5/0004 |
| 11,627,798 B2* | 4/2023 | Springer | ................ | F16M 13/02 108/134 |
| 2005/0062238 A1* | 3/2005 | Broadfield | ............. | A61B 50/18 280/1 |
| 2007/0069614 A1* | 3/2007 | Waugh | ................. | A47B 46/005 312/245 |
| 2008/0168930 A1* | 7/2008 | Calero | ................... | A47B 81/06 108/50.02 |
| 2009/0210089 A1* | 8/2009 | Christie | ................ | G16H 20/13 700/244 |
| 2009/0251293 A1 | 10/2009 | Azevedo et al. | | |

(Continued)

*Primary Examiner* — Sagar Shrestha
(74) *Attorney, Agent, or Firm* — Braxton Perrone, PLLC; Bobby W. Braxton; Gregory Perrone

(57) ABSTRACT

A cabinet for charting. The cabinet includes a charting station, a computer cabinet, and at least one supplemental cabinet. Medicine, PPE, medical equipment, etc. can be stored in the supplemental cabinet. The charting station allows a user to enter information about a patient. The charting station can include a monitor, keyboard, and/or a scanner. The charting station can be coupled to the base via an arm.

10 Claims, 2 Drawing Sheets

(56) References Cited

U.S. PATENT DOCUMENTS

| | | | |
|---|---|---|---|
| 2011/0110026 A1* | 5/2011 | Goza | H05K 5/0021 |
| | | | 361/679.6 |
| 2011/0235250 A1* | 9/2011 | Burgess | F16M 11/24 |
| | | | 361/679.01 |
| 2012/0323362 A1* | 12/2012 | Paydar | G07F 9/002 |
| | | | 29/434 |
| 2014/0184038 A1* | 7/2014 | Shoenfeld | E05B 65/46 |
| | | | 312/209 |
| 2017/0061095 A1* | 3/2017 | Waskin | G07C 9/00174 |
| 2018/0256427 A1* | 9/2018 | Volek | G16H 20/13 |
| 2019/0105120 A1* | 4/2019 | Norman | A61M 5/1417 |
| 2019/0286190 A1* | 9/2019 | Salmon | G06F 1/1607 |
| 2021/0193284 A1 | 6/2021 | Parviainen et al. | |
| 2021/0228008 A1* | 7/2021 | Stanley, Jr. | A47G 1/04 |

\* cited by examiner

CHARTING CABINET

PRIORITY

The present invention claims priority to U.S. 63/085,060 filed Sep. 29, 2020, the entirety of which is hereby incorporated by reference.

BACKGROUND OF THE INVENTION

Technical Field

The present invention relates to a system and method for a charting cabinet.

Description of Related Art

Doctors, nurses, and other medical personnel often use charting stations to enter, store, and retrieve information which is pertinent to a patient and the patient's treatment. There is a need for an improved charting station.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
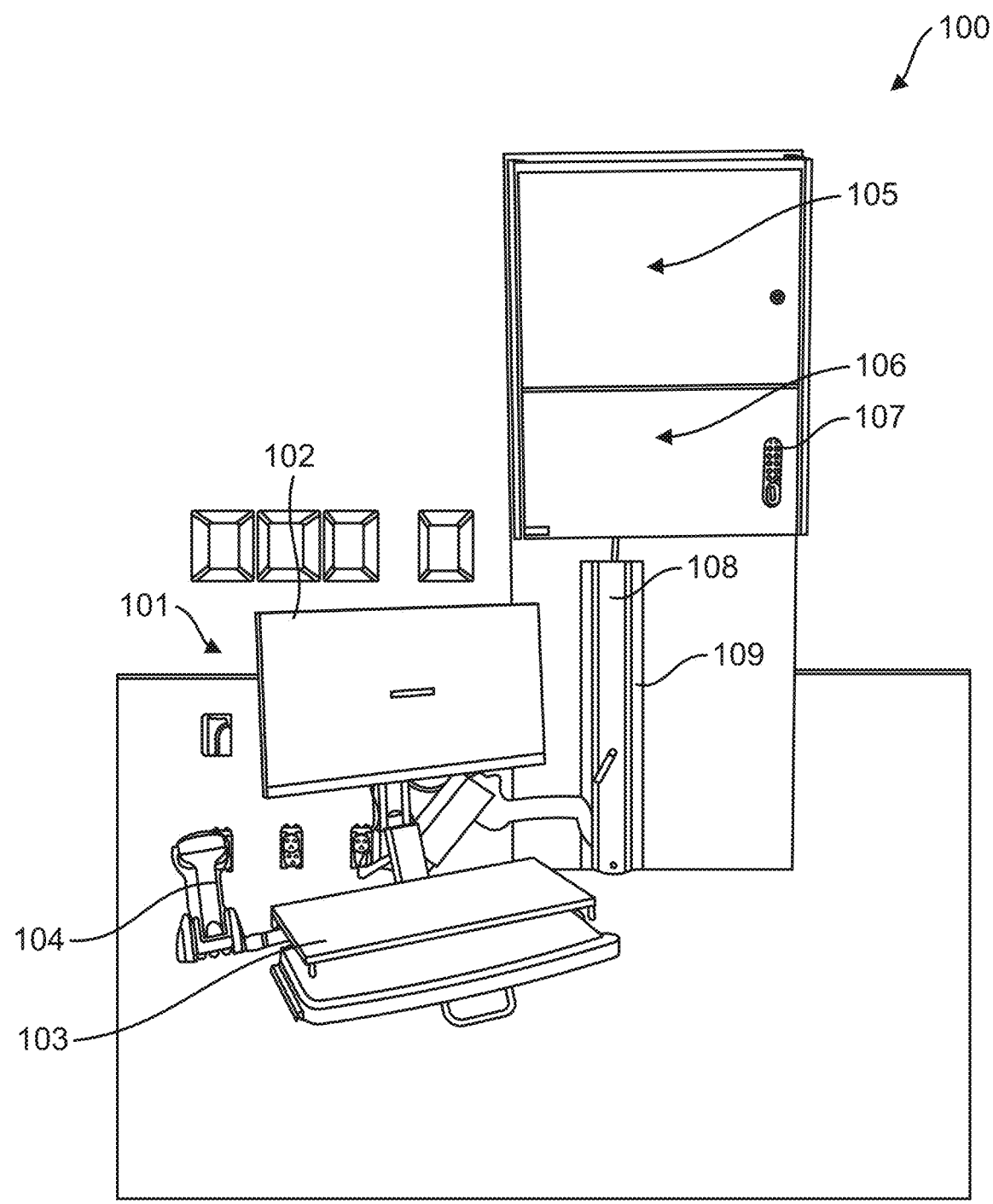
FIG. 1 is a perspective view of a charting cabinet in one embodiment.

FIG. 1 is a perspective view of a charting cabinet in one embodiment. A charting cabinet 100 is coupled to a charting station 101.

The charting station 101 is used to enter, view, and store information which is pertinent to a patient. A doctor, nurse, or other healthcare personnel can view and enter information relevant to a patient. The chart station 101 can be used to display results, order medicine, show charts from the previous shift, etc.

As shown the charting station 101 comprises a monitor 102 for viewing information. Virtually any type of monitor can be utilized. As shown the monitor can swivel about a base 108. The monitor 102 can extend, pivot, and move to accommodate the health care professional's location.

The charting station 101 further comprises a data entry device 103. As shown the data entry device 103 is a keyboard and a mouse. While a keyboard is depicted, this is for illustrative purposes only and should not be deemed limiting. The data entry device can comprise any device which is used to enter data to a computer. It can include a tablet, a mouse, a keypad, a keyboard, a scanner, biometric devices, etc. Any device which can capture and receive data or information can be used as a data entry device 103.

As depicted, the charting station 101 further comprises a scanner 104. A scanner 104 can be used to scan bar codes. Bar codes are often placed on medications, medical supplies, etc. This assists the provider is maintaining inventory as well as verifying what medicines have been provided to the patient. The scanner 104 is a type of data entry device 103.

The chart station 101 is a valuable tool which aids medical professionals in giving aid to the patient. As noted, in some embodiments the monitor 102 and/or the data entry device 103 can swivel relative to the base 108.

In one embodiment the charting station 101 is coupled to a charting cabinet 100. A charting cabinet 100 is a cabinet which has two or more storage cabinets and which is coupled to a charting station. As depicted, the charting cabinet 100 has two separate cabinets 105, 106.

The top cabinet 105, in the embodiment depicted, houses the computer. As noted, charting station 101 is coupled to a computer. In one embodiment the computer is housed in a cabinet 105. Housing the computer in a cabinet 105 as opposed to being on the ground, for instance, keeps the computer safe. This location also prevents patients, visitors, and others from intentionally or accidentally touching or powering-down the computer. In one embodiment the computer cabinet 105 is locked.

As can be seen, the cords and cables necessary for the operation of the monitor 102, data entry device 103, and the scanner 104, are stored adjacent to or within the base 108. In one embodiment the base 108 covers the cords and cables. In one embodiment the cables, such as power cords, are placed within the base 108. This prevents a loose cord from being pulled or accidentally disconnected. The cords and cables are directed to the computer cabinet 105 where they are in electrical communication with the computer in the computer cabinet 105. In other embodiments, one or more computer devices, such as the data entry device, are wirelessly connected to the computer.

As shown the monitor 102 is coupled to the base 108 via an arm. This allows the monitor 102 and/or the data entry device 103 to pivot as needed. Such an embodiment depicts a moveable monitor. In other embodiments, however, a fixed monitor 102 is utilized. In this embodiment, the monitor 102 is in a fixed location relative to the base 108.

The base 108 can be coupled to the charting cabinet 100 via any method or device known in the art. In one embodiment, and as depicted, the base 108 is mechanically coupled below the supplemental cabinet 106. As shown, the charting cabinet 100 extends downwardly beyond the cabinets 105, 106. The mount 109 extends beyond the cabinets 105, 106 and provides a planar surface onto which the base 108 can be attached. As can be seen better in FIG. 2, the monitor 102 can be positioned in a location underneath the supplemental cabinet 106. In one embodiment, the monitor 102 is stored such that the cabinets extend further away from the adjacent wall than does the monitor 102. As noted, this helps reduces the space required for the charting system.

In one embodiment both the base and the monitor arm attach to the mount 109. Thus, in one embodiment mount 109 provides a way to couple the cabinets with the base and the arm.

Adjacent to the computer cabinet 105 is a supplemental cabinet 106. As depicted the supplemental cabinet 106 is below the computer cabinet 105, but this is for illustrative purposes only and should not be deemed limiting. Thus, in some embodiment the computer cabinet 105 and the supplemental cabinet 106 are vertically aligned. In other embodiments the supplemental cabinet is located atop, and in still other embodiments a supplemental cabinet 106 is stored adjacent to the computer cabinet 105.

The supplemental cabinet 106 can house virtually any item. It can be used to store medicines, personal protection equipment, or other medical equipment. It can also be used to store patient items. Thus, it can be used as a patient locker to house personal items for the patient.

The supplemental cabinet 106 can have a door as shown. It can also include a lock 107 as shown. In other embodiments, however, the supplemental cabinet 106 does not comprise a door. Instead, the supplemental cabinet 106 comprises a void for storing items but no separate door. In other embodiments, the top cabinet 105 has a lock.

The supplemental cabinet 106 can take many different forms. It can comprise one hollow cavity for storing items. In other embodiments the supplemental cabinet 106 will have or more of a plurality of shelves. In one embodiment the supplemental cabinet 106 will have slits or other items from which to retrieve items, such as gloves.

Figure 2:
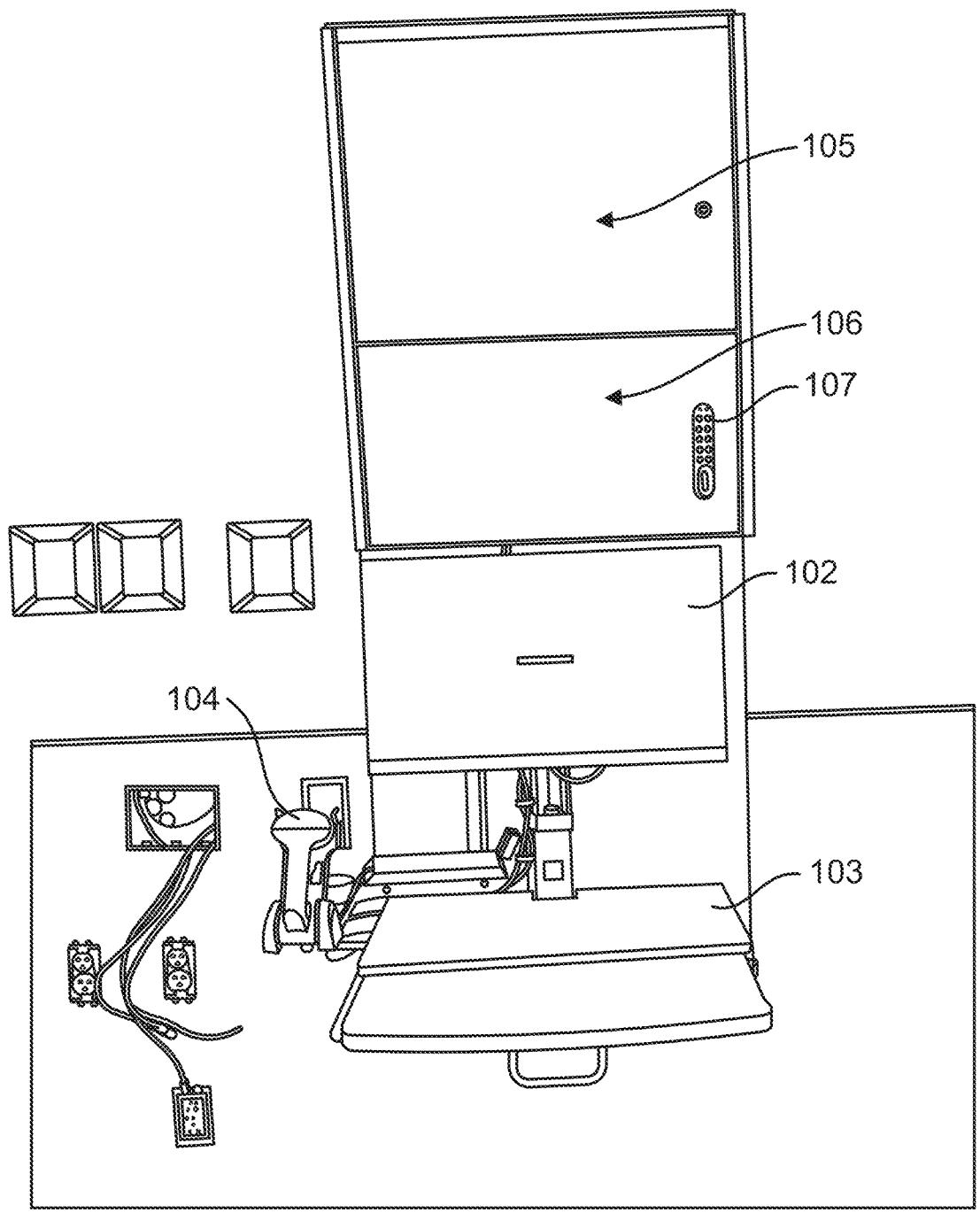
FIG. 2 is a perspective view of a charting cabinet in one embodiment.

FIG. 2 is a perspective view of a charting cabinet in one embodiment. In this embodiment the monitor 102 and data entry device 103 have been pushed to be in vertical alignment with the charting cabinet 100. In this orientation, the charting station 101 takes up less space.

The supplemental cabinet 106 provides an additional opportunity to store items. Space in a hospital or other medical facility is often at a premium. Accordingly, one way to maximize space is to build vertically. If two square feet are being used for a charting station 101, as an example, then utilizing the space above the charting station 101 allows for more efficient utilization of the space. That space is otherwise wasted. Accordingly, the charting cabinet 100 allows for greater utilization of space than previously obtained.

As noted, when space is a premium, using every available inch matters. Adding a supplemental cabinet 106 increases the space available. In one embodiment 9.3 square feet of wall space is utilized. It should be noted that these dimensions can change based on customer preferences.

In one embodiment the charting cabinet extends from about 4 to about 12 inches from the mounting wall. In one embodiment the charting cabinet extends 5 and ⅝ of an inch from the mounting wall. The charting cabinet has a width of between about 12 inches and about 30 inches. In one embodiment the cabinet has a width of about 20 and ⅛ inches without the door and about 24 inches with the door. The height can also vary from about 10 inches to about 60 inches. In one embodiment the height, including the mount 109 is about 56 inches.

As noted, the supplemental cabinet 106 can be above, below, or adjacent to the computer cabinet 105. Further, in some embodiments there can be more than one supplemental cabinet 105. As an example, a first supplemental cabinet 106 is depicted below the computer cabinet 105, but a second supplemental cabinet 106 can be located above the computer cabinet 105. In some embodiments, one or more supplemental cabinets 106 are stacked all the way to the ceiling. This allows for the efficient utilization of space.

The charting cabinet 101 can have various shapes. As depicted the cabinets have a square or rectangular cross-section, but virtually any shape can be utilized.

The charting cabinet 101 can comprise virtually any material. It can comprise wood, plastic, metal, glass, and combinations thereof. Thus, while a wooden door is shown in FIGS. 1 and 2, this is for illustrative purposes only. In other embodiments, for example, the door is glass.

Aside from providing increased space, the supplemental cabinet 106 provides other advantages. Its location adjacent to the charting station 101, for example, provides benefits. Consider a medicine being delivered to a patient. The personnel delivering the medicine is not always the person administering the medicine. Thus, the delivery personnel can record that the medicine was received, log that information into the charting station 101, and then store the medicine in the supplemental cabinet 106. Later, the medical personnel who will administer the medicine to the patient uses the charting station 101 to see that the medicine is stored in the supplemental cabinet 106. The individual can then access the medicine from the supplemental cabinet 106, administer the medicine, and log all events in the charting station 101. Thus, having a location to store medicine and other medical equipment adjacent the charting station 101 provides unexpected advantages.

While the invention has been particularly shown and described with reference to a preferred embodiment, it will be understood by those skilled in the art that various changes in form and detail may be made therein without departing from the spirit and scope of the invention.

What is claimed is:

1. A system for a charting cabinet, said system comprising:
   a charting station;
   a computer cabinet coupled to said charting station;
   at least one supplemental cabinet coupled to said computer cabinet;
   a mount which extends downwardly beyond said computer cabinet and said supplemental cabinet; wherein said mount is coupled to a mounting wall;
   wherein said mount is elongated vertically below said computer cabinet and said supplemental cabinet;
   a base coupled to said mount, and a monitor arm coupled to said base; wherein said monitor arm is located below said computer cabinet and below said supplemental cabinet.

2. The system of claim 1 wherein said computer cabinet and said supplemental cabinet are vertically aligned.

3. The system of claim 1 wherein said charting station comprises a monitor and a data entry device electrically coupled to said base.

4. The system of claim 3 wherein said monitor comprises a power cord, and wherein said power cord is within said base.

5. The system of claim 1 wherein said arm further couples to a data entry device.

6. The system of claim 5 wherein said data entry device comprises a keyboard.

7. The system of claim 1 further comprising a scanner.

8. The system of claim 1 wherein said base is located below said supplemental cabinet and below said computer cabinet.

9. The system of claim 1 wherein said supplemental cabinet comprises a lock.

10. The system of claim 1 wherein said supplemental cabinet is below said computer cabinet.

* * * * *